May 8, 1962 A. WORLAND 3,034,022
SWITCHING CIRCUITS
Filed Jan. 7, 1959
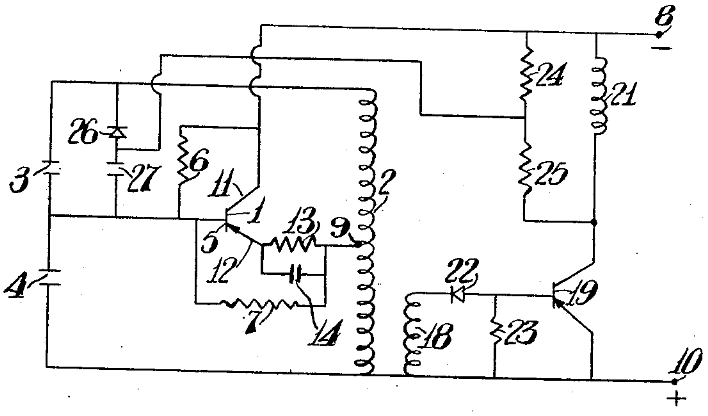
Inventor
A. Worland
By Mascock Downing Seebold
Attys.

United States Patent Office 3,034,022

Patented May 8, 1962

3,034,022
SWITCHING CIRCUITS

Arthur Worland, Bangor, Wales, assignor to Fielden Electronics Limited, Wythenshawe, Manchester, England, a British company Filed Jan. 7, 1959, Ser. No. 785,467
Claims priority, application Great Britain Jan. 16, 1958
8 Claims. (Cl. 317—146)

This invention relates to switching circuits comprising valve or transistor oscillators.

It is known to provide a thermionic valve oscillator having a bridge connected oscillatory circuit consisting of a first and a second capacitative element and an inductive element connected in series in a closed loop, the common connection of the capacitative elements and a tapping on the inductive element forming the output terminals of the bridge and a valve having its input circuit connected between the output terminals of the bridge and its output circuit connected to one element of the bridge whereby when the bridge is on one side of balance the energy supplied to said one element induces oscillation and when the bridge is on the other side of balance the oscillator is quiescent.

Such an oscillator reaches the threshold of oscillation, that is, the condition at which oscillation just commences, when the positive feedback to the input circuit of the valve via one parallel path through the bridge between the output terminals of the bridge exceeds by a sufficient margin the negative feedback to the input circuit of the valve via the other parallel path through the bridge between the output terminals.

Oscillators of this known kind are used for the purpose of detecting when a variable element of the bridge attains a predetermined magnitude, the oscillator being arranged to reach the threshold of oscillation when that variable element attains the predetermined magnitude. For this purpose it is usual to provide a rectifier means having its input circuit magnetically coupled to the inductive element of the bridge and its output circuit connected to the energising winding of a relay, the energising winding being thus energised by a direct current which is proportional to the amplitude of oscillation. Such an arrangement is known in the art as a switching circuit.

It is well known that the thermionic valve in the switching circuit described above may be replaced by a transistor.

A relay, however, requires a certain minimum change in energisation if its operation is to be certain and the object of the invention is to provide novel means for ensuring that the change in the energisation of the relay shall exceed that minimum when the oscillator reaches the threshold of oscillation in changing from a quiescent to an oscillatory condition.

According to the invention, in a switching circuit comprising an oscillator having a bridge-connected oscillatory circuit consisting of a first and a second capacitative element and an inductive element connected in series in a closed loop, the common connection of the capacitative elements and a tapping on the inductive element forming the output terminals of the bridge, an amplifying element having its input circuit connected between the output terminals of the bridge and its output circuit connected to one element of the bridge whereby, when the bridge is on one side of balance the energy supplied to the said one element induces oscillations and when the bridge is on the other side of balance the oscillator is quiescent, rectifier means having its input circuit coupled to said bridge and its output circuit connected to the energising swinding of a relay and providing said winding with an energising current dependent upon the amplitude of oscillation, said energising current being sufficient to operate said relay with certainty when the bridge is unbalanced on said one side of balance by a predetermined amount, one arm of the said bridge includes a further element having capacitance dependent upon the potential applied to it, said further element being connected to said rectifier means by circuit means such that a potential dependent upon such energising circuit is applied to said further element to cause such a change in the capacitance of said further element that the bridge is unbalanced by at least said predetermined amount when the oscillator reaches the threshold of oscillation whilst changing from a quiescent to an oscillatory condition.

One embodiment of the invention will now be described by way of example with reference to the accompanying drawing.

In the arrangement shown in the drawing an oscillator comprises a transistor 1 of the p-n-p type and a bridge connected oscillatory circuit comprising a tapped inductance 2 and two capacitances 3 and 4. The mean potential of the base electrode 5 of the transistor 1 is maintained at a suitable value in known manner by connecting that electrode to the common connection between two resistances 6 and 7 which together constitute a potential divider connected between the negative terminal 8 of an electrical source and the tapping point 9 on the inductance 2, one end of the inductance 2 being connected to the positive terminal 10 of the electrical source. The collector electrode 11 of the transistor is connected to the negative terminal 8 of the source and the emitter electrode 12 is connected to the tapping point 9 through a resistance 13 which is shunted by a capacitance 14. The capacitance 14 ensures that the emitter electrode 12 is effectively connected, so far as oscillatory current is concerned, directly to the tapping point 9. The resistance 13 co-operates with the resistances 6 and 7 to stabilise the D.C. working point of the transistor in known manner.

The inductance 2 is inductively coupled to an inductance 18 and the voltage induced in the inductance 18 is rectified by the rectifier 22 to produce a D.C. current in the base-emitter circuit of transistor 19. A resistor 23 serves as a shunt across the base-emitter junction and is effective to reduce the collector current to an acceptable minimum when the rectifier 22 is not delivering current. The collector electrode is connected to the negative terminal 8 through the winding of a relay 21.

Connected in parallel with the winding 21 is a potential divider formed by two resistances 24 and 25. Connected in parallel with the capacitance 3 is a series circuit consisting of a junction diode 26 and a blocking capacitance 27, the common connection of the diode 26 and capacitance 27 being connected to the common connection of the resistances 24 and 25. The capacitance of the diode 26 is thus one of a group of elements forming one arm of the bridge connected oscillatory circuit. Capacitance 27 is preferably considerably larger than the capacitance of the diode 26 so that the latter capacitance is, in effect, connected directly in parallel with the capacitance 3. In order to reduce losses to a minimum the relative values of the resistances 24 and 25 are so chosen that the reverse bias applied to diode 26 exceeds the peak of the oscillatory voltage across capacitance 3 and hence no substantial current flows through diode 26. The capacitance of the diode 26 increases as the potential across it falls and vice versa.

Assuming that the oscillatory circuit is not oscillating and that the capacitance 3 increases (or capacitance 4 decreases) in dependence upon some variable until a point is eventually reached at which the oscillatory circuit just commences to oscillate. Current then commences to increase in the output circuit of the transistor 19 causing the reverse bias applied to the diode 26 to fall and this, in turn, causes an increase in the capacitance of the diode 26 and, therefore, an increase in the amplitude of oscillation. Provided, therefore, that the gain of the loop which includes as its feedback link the connection between the potential divider 24, 25 and the diode 26 is greater than unity the current flowing through the coil 21 rises from almost zero to a maximum at a speed which is determined only by the effective time constant and gain of that loop.

Assuming that the oscillatory circuit is oscillating and that the capacitance 3 decreases (or capacitance 4 increases) in dependence upon some variable, the reverse effect will occur; the oscillatory circuit will fall out of oscillation and the current through the coil 21 will fall from a maximum almost to zero with great rapidity. It will, however, be necessary to decrease capacitance 3 (if that is the capacitance which is varying) to a value which is less than the value at which oscillation commenced, the difference in the two values being substantially equal to the change of capacitance of the diode 26. The circuit will thus possess back-lash and, since the value of the change of capacitance of the diode 26 depends upon the relative values of the resistances 24 and 25 the magnitude of this backlash may be varied by variation of either or both of the resistors 24 and 25.

The oscillatory circuit shown in the drawing may be replaced by its dual and either transistor may be replaced by a transistor of the n-p-n type or a thermionic valve, the circuit being modified accordingly in a manner which will be apparent to those skilled in the art.

What I claim is:

1. In an oscillatory circuit comprising two capacitances and an inductive winding connected in series in a closed loop, one of said capacitances being variable, a tapping terminal at an intermediate point on said winding, an amplifier including an electron discharge device having its signal input electrodes connected between the common junction of the capacitances and the tapping terminal of the winding, a source of power connected between a third electrode of the discharge device and one end of the winding, said circuit becoming oscillatory as the ratio of the values of the capacitances varies in one direction from a predetermined value due to variation of the variable capacitance; the improvement comprising a variable capacitive element having a value dependent on the potential applied thereto, means coupling the element in parallel with one of said capacitances, a rectifier having its input coupled to the oscillatory circuit and having an output circuit providing a unidirectional potential of an amplitude dependent on the amplitude of oscillations in the oscillatory circuit, means for applying the unidirectional potential to the element to further vary the ratio of the capacitances in the one direction as the oscillatory circuit becomes oscillatory to increase the amplitude of oscillations.

2. In the oscillatory circuit according to claim 1 wherein said element is a semiconductor diode so poled that said unidirectional potential is applied thereto in a reverse direction.

3. In the oscillatory circuit according to claim 2 wherein said coupling means includes a blocking condenser having a capacitance at least several times larger than that of said diode, said blocking condenser and said diode being connected in series and the series circuit so formed being connected in parallel with said one capacitor.

4. In the oscillatory circuit according to claim 1 in which the output circuit of the rectifier includes an amplifier connected across the source of power and having its input controlled by the rectifier, and a relay having an energizing winding in the output of the amplifier, whereby said relay operates with certainty when oscillations appear in the oscillatory circuit.

5. In the oscillatory circuit according to claim 4 in which the means for applying the unidirectional potential to the element comprises a pair of series connected resistances connected in parallel across the relay winding and a connection from the common junction of the resistances to said element.

6. In the oscillatory circuit according to claim 5 in which the values of the resistances are such that the unidirectional potential applied to the element exceeds the peak oscillatory voltage appearing across the capacitance in parallel with the element.

7. In an oscillatory circuit according to claim 5 wherein the ratio of the values of the resistances is variable.

8. In the oscillatory circuit according to claim 1, in which the rectifier includes means for amplifying the signal coupled to its input by the oscillatory circuit, with a gain of greater than unity.

References Cited in the file of this patent

UNITED STATES PATENTS

| | | |
|---|---|---|
| 2,640,978 | Claesson et al. | June 2, 1953 |
| 2,773,220 | Aron | Dec. 4, 1956 |
| 2,774,919 | Coles | Dec. 18, 1956 |